United States Patent [19]

Hirose et al.

[11] Patent Number: 4,646,887

[45] Date of Patent: Mar. 3, 1987

[54] GEAR DRIVE APPARATUS

[75] Inventors: Kimiharu Hirose, Obu; Yoshikatsu Furuya, Toyota, both of Japan

[73] Assignee: Aisin Seiki Kabushiki Kaisha, Japan

[21] Appl. No.: 713,849

[22] Filed: Mar. 20, 1985

[30] Foreign Application Priority Data

Mar. 21, 1984 [JP] Japan .............................. 59-40584[U]

[51] Int. Cl.⁴ ...................... F16D 67/00; F16H 55/00; F16B 7/00

[52] U.S. Cl. ...................................... 192/8 C; 74/432; 403/282; 403/359

[58] Field of Search ........................ 403/359, 274, 282; 474/902, 903; 74/431, 449, 448, 447, 432; 29/521; 192/8 C

[56] References Cited

U.S. PATENT DOCUMENTS

| | | | |
|---|---|---|---|
| 1,788,168 | 1/1931 | Nicholson | 74/449 |
| 2,923,166 | 2/1960 | Brindley et al. | 74/449 |
| 4,226,454 | 10/1980 | Tranberg et al. | 463/359 |
| 4,252,029 | 2/1981 | Huret | 474/902 |
| 4,353,705 | 10/1982 | Scott-Jackson et al. | 403/359 |
| 4,416,650 | 11/1983 | Wilkins | 474/903 |

*Primary Examiner*—Allan D. Hermann
*Attorney, Agent, or Firm*—Finnegan, Henderson, Farabow, Garrett & Dunner

[57] ABSTRACT

A gear drive apparatus is provided which includes a rotatable drive shaft, a driving member, a driven member and a pinion gear. The rotatable drive shaft contains a handle and a stem. The driving member is integrally connected to the stem and rotates with the stem in response to the rotation of the handle. The driven member is coaxially positioned about the stem and engages the driving member. At least one radial aperture and radial groove are coaxially formed on the driven member and rotated about the stem. A pinion gear is rotatably mounted on the stem and includes at least one radial boss and pinion teeth, which extend from the pinion gear. The radial boss is positioned within the radial groove and a portion of one of the pinion teeth is fitted within the radial aper.

4 Claims, 11 Drawing Figures

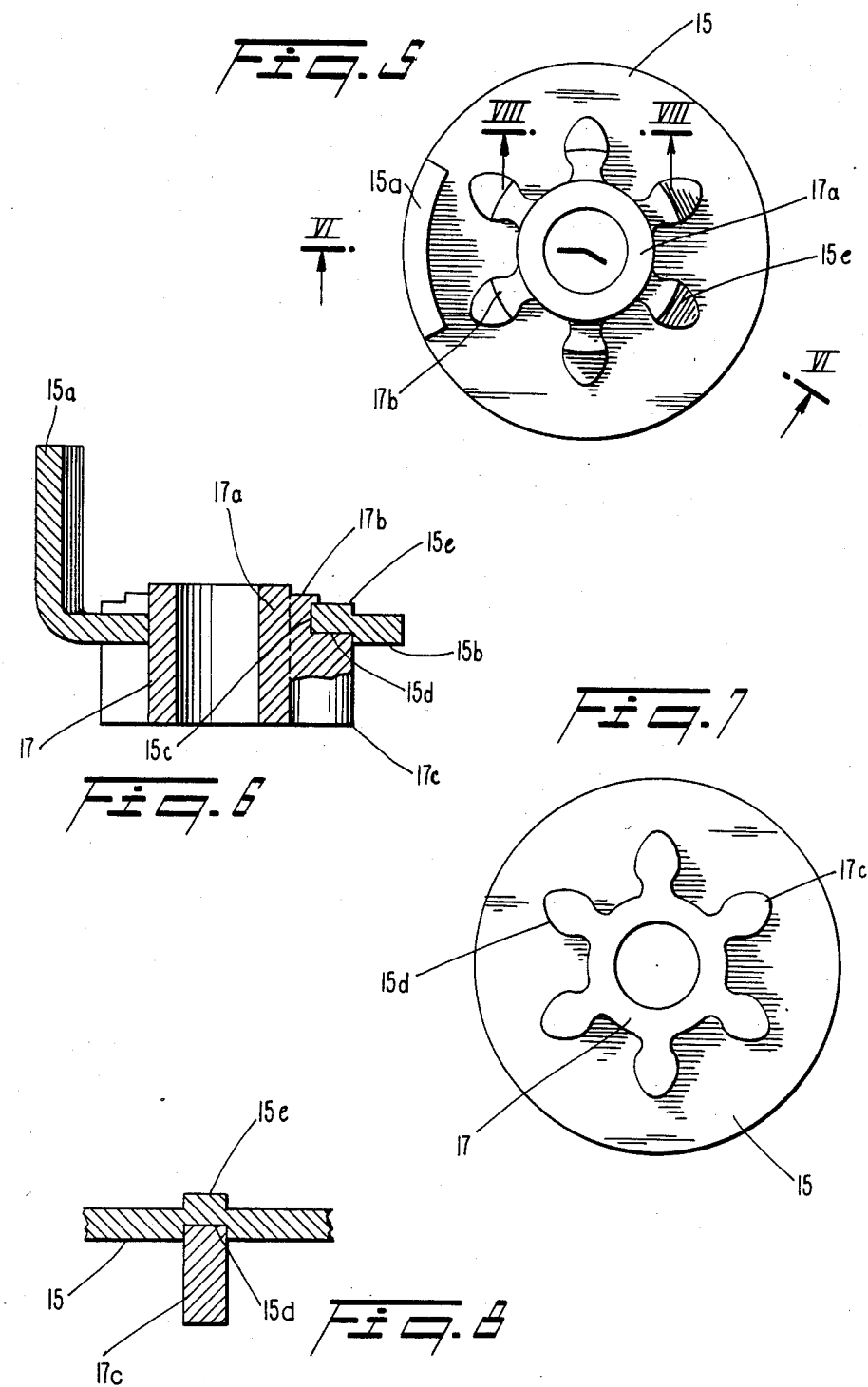

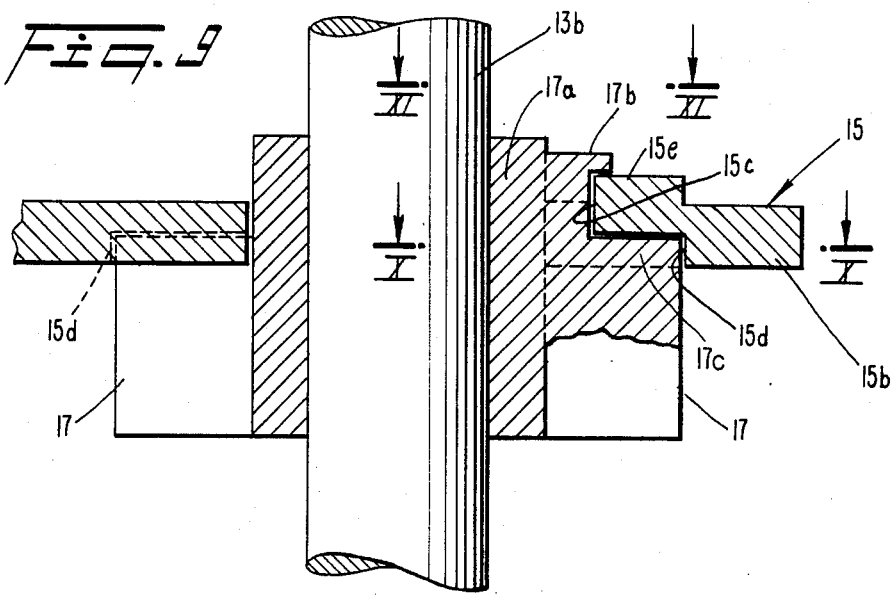
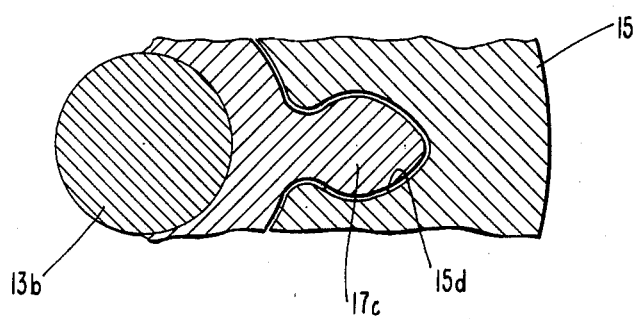
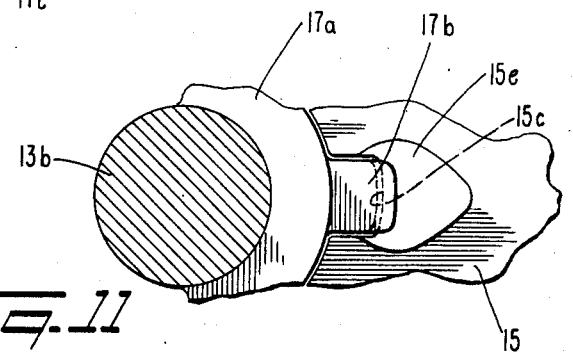

GEAR DRIVE APPARATUS

BACKGROUND OF THE INVENTION

The invention relates generally to a gear drive apparatus having a pinion gear member and more particularly to a gear drive apparatus having a pinion gear member for use in vehicle window regulators or seat lifters.

Automobile window raising and lowering devices usually include a gear train driven by rotation of a handle wherein the gear train operates a linkage that is connected to a window support. In one type of window drive mechanism a driving plate is keyed to a pinion. In use of such a mechanism there is a tendency for the pinion to twist with respect to the remainder of the drive mechanism resulting in points of high stress concentration which often results in the fracture of a gear tooth.

SUMMARY OF THE INVENTION

Accordingly, it is an object of the present invention to provide a gear drive apparatus in which a pinion gear cooperates with a driven gear without resulting in the shearing of a tooth from the pinion gear.

It is also an object of the present invention to provide a gear drive apparatus in which the load is more evenly distributed about the pinion gear.

Additional objects and advantages of the present invention will be set forth in part in the description that follows and in part will be obvious from the description or may be learned by practice of the invention. The objects and advantages of the invention may be realized and obtained by the methods and apparatus particularly pointed out in the appended claims.

To achieve the objects and in accordance with the purpose of the invention, as embodied and as broadly described herein, a gear drive apparatus includes a rotatable drive shaft, a driving member, a driven member and a pinion gear. The rotatable drive shaft contains a handle and a stem. The driving member is integrally connected to the stem and rotates with the stem in response to the rotation of the handle. The driven member is coaxially positioned about the stem and engages the driving member. At least one radial aperture and radial groove are coaxially formed on the driven member and rotated about the stem. A pinion gear is rotatably mounted on the stem and includes at least one radial boss and pinion teeth, which extend from the pinion gear. The radial boss is positioned within the radial aperture, whereas the portion of one of the pinion teeth is fitted within the radial groove. Also, according to the present invention, the gear drive apparatus may include an arcuate slot formed in the driving member and a projection lug extending from the driven member which is seated within the arcuate slot.

The accompanying drawings, which are incorporated in and constitute part of the specification, illustrate one embodiment of the invention and, together with the description, serve to explain the principles of the invention.

BRIEF DESCRIPTION OF THE DRAWINGS

FIG. 5 is a top plan view of the driven member and the pinion gear of the present invention;

FIG. 6 is a sectional view taken along line VI—VI of FIG. 5;

FIG. 7 is a bottom plan view showing the driven member with the pinion gear;

FIG. 8 is a sectional view taken along line VIII—VIII of FIG. 5;

FIG. 9 is an enlarged side elevational view partially in section of the boss portion and the toothed portion of the pinion gear engaging with a groove and an aperture of the driven member;

FIG. 10 is a plan view of a tooth portion of the gear fitted within the radial aperture looking in the direction of the arrows X—X of FIG. 9; and FIG. 11 is a plan view of the radial boss positioned within the radial groove looking in the direction of arrows XI—XI of FIG. 9.

DESCRIPTION OF THE PREFERRED EMBODIMENT

Figure 1:
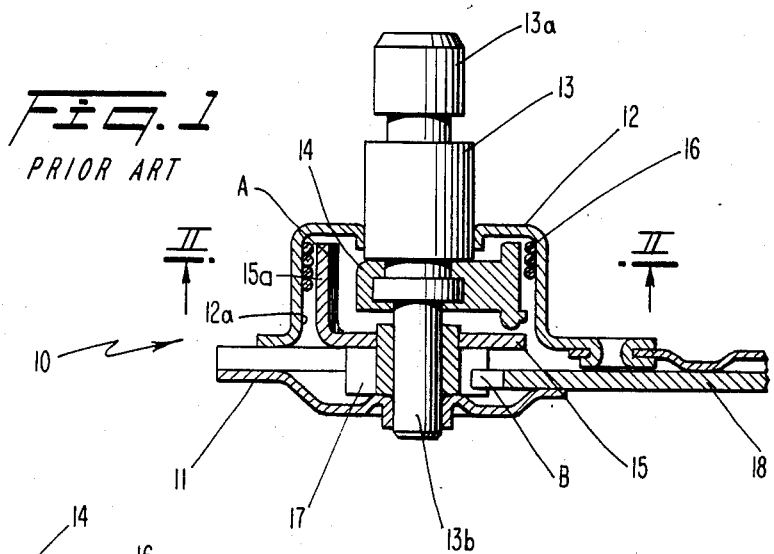
FIG. 1 is a sectional view of a conventional gear drive apparatus for raising and lowering vehicle windows.

Reference will now be made in detail to a presently preferred embodiment of the invention, an example of which is illustrated in the accompanying drawings.

The preferred embodiment of the gear drive apparatus is shown in FIGS. 5-11 and is generally denoted by the reference numeral 10. As embodied herein, the driving apparatus 10 typically includes a base plate 11, a casing 12 fixed thereon and a driving shaft 13 rotatably supported on the base plate 11 and within the casing 12. The driving shaft 13 includes a handle 13a and a stem 13b. A driving member 14 and a driven member 15 are coaxially disposed within the casing 12. The driving member 14 is integrally connected to the driving shaft and the driven member 15 is rotatably supported around the driving shaft 13.

Figure 2:
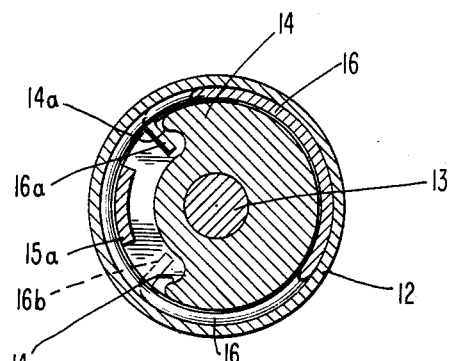
FIG. 2 is a sectional view taken along line II—II of FIG. 1 and showing the disposition of the braking spring within the conventional gear drive apparatus.
Figure 3:
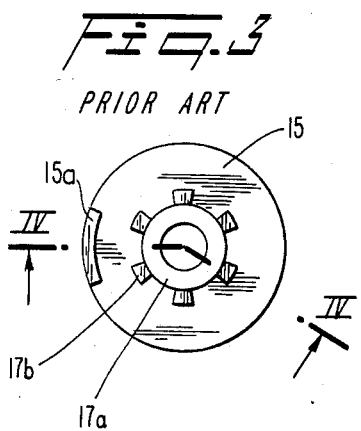
FIG. 3 is a plan view showing a driven member of the conventional gear drive apparatus of FIG. 1.
Figure 4:
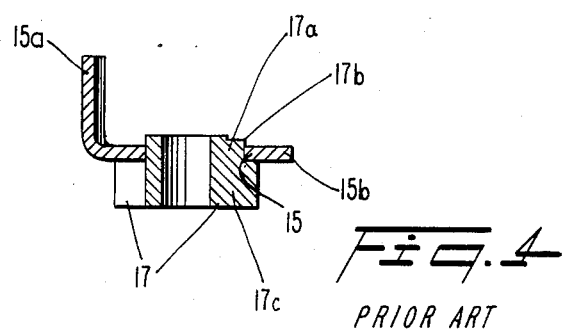
FIG. 4 is a sectional view taken along FIG. IV-IV of FIG. 3 and showing the conventional driven member of FIG. 1 engaging a pinion gear.

An arcuate slot 14a is formed on the driving member 14 and a projection lug 15a of the driven member 15 extends within the arcuate groove 14a as shown in FIG. 2, enabling the driving member 14 to rotate the driven member 15. A pinion gear 17 is secured to the driven member 15 and engages a driven member 18, which is connected to a window regulator arm (not shown). A torsion or braking spring 16 is seated around the driving member 14 and includes end portions 16a, 16b which are disposed within the arcuate groove 14a of the driving member 14 and the projection lug 15a of the driven member 15. A peripheral surface of the braking spring is frictionally connected to an inner surface 12a of the casing 12.

The gear driving apparatus 10 is actuated by rotation of the driving shaft 13, thereby rotating the driving member 14. The arcuate slot 14a engages one of the end portions 16a, 16b of the braking spring 16 to rotate the driving member 14. As a result, the braking spring 16 is drawn toward the driving member so that the peripheral surface of the braking spring 16 separates or releases from the inner surface 12a of the casing 12. Continued rotation of the driving shaft 13 enables the recessed portion of the driving member 14 to engage the projection lug 15a of the driven member 15 allowing the driven member 15 to rotate around the driving shaft 13 together with the driving member 14. The pinion gear 17, which is coaxially provided on the driven member 15, rotates around the driving shaft 13. Further, rotation of the pinion gear 17 drives the drive gear 18 to raise and lower a window, for example.

The weight of the window will cause the pinion gear 17 to rotate through the driven gear 18. Thus, the projection lug 15a of the driven member 15, which is integrally fixed to the pinion gear 17, abuts one end of the end portion 16a, 16b of the braking spring 16. As the diameter of the peripheral surface of the braking spring 16 expands, the peripheral surface of the braking spring 16 engages the inner surface of the casing 12. Thus, the rotation of the driven member 15 is arrested and the window can be opened to any position as desired.

To the extent described with respect to the background of the invention, the present invention corresponds in general to the conventional apparatus depicted in FIGS. 1–4. As shown in FIGS. 5–11, the pinion gear 17 of the present invention includes a radial boss portion 17a and toothed portion 17c, which extend radially outward to form the pinion gear 17. The driven member 15 is coaxially mounted about the stem 13b and includes a support section 15b having slot or radial apertures 15c and radial grooves 15d, which are coaxially formed in the support section 15 of the driven member 15. The driven member 15 is embossed to form embossments 15e and the radial grooves or gear shaped cavities 15d. Each radial boss portion 17a is positioned or keyed within individual radial apertures 15c. In addition, a portion of each toothed portion 17c is separately fitted within radial grooves 15d. Thus, a plurality of boss portions 17a and toothed portions 17c may extend radially for individual engagement with the radial apertures 15c and the radial grooves 15d, respectively.

As embodied herein and shown in FIGS. 6 and 9, the present invention may include a retainer portion 17b, to restrict the movement of the pinion gear 17 along its longitudinal axis.

The operation of the gear drive apparatus of the present invention will be now described in detail with reference to the figures. Rotation of handle 13a of the driving shaft 13 causes the braking spring 16 to disengage from the inner surface 12a of the casing 12. Further rotation enables the driving member 14 to engage the driven member 15, which in turn rotates the pinion gear 17. As shown particularly in FIGS. 6 and 9, a radially extending portion of each toothed portion 17c of the pinion gear is positioned within individual radial grooves 15d, while each boss portion 17a is seated within individual radial apertures 15c. The retainer portion 17b enables the pinion gear 17 and the driven plate 15 to be continuously engaged, as the pinion gear 17 rotatably engages the driven gear 18. As the pinion gear 17 is rotated, the length of each toothed portion 17c engages within the radial groove 15d and stress is distributed along the entire radial length of each toothed portion 17c. Consequently, stress is more evenly distributed about the toothed portion 17c thus improving the mechanical strength of the pinion gear 17.

It will be apparent to those skilled in the art that modifications and variations can be made to the gear drive apparatus of the present invention. The invention in its broader aspects is, therefore, not limited to the specific details, representative apparatus and illustrative examples shown and described. Thus, it is intended that all matter pertaining to the foregoing description or shown in the accompanying drawings will be interpreted as illustrative and not in a limiting sense.

What is claimed is:

1. A gear drive apparatus, which comprises:
    a rotatable drive shaft having a handle and a stem,
    a driving member integrally connected to said stem for rotation with said stem in response to the rotation of said handle;
    a driven member coaxially positioned about said stem for engagement with said driving member, said driven member, said driven member having at least one radial aperture and at least one raidal groove extending radially outwardly from the radial aperture coaxially formed therein for rotation about said stem; and
    a pinion gear rotatably mounted on said stem, said pinion gear having at least one radial boss and pinion teeth extending therefrom, said radial boss positioned within said radial aperture and a portion of one of said pinion teeth fitted within said radial groove.

2. The gear drive apparatus defined in claim 1, said driving member having an arcuate slot and said driven member having a projection lug seated within said slot.

3. The gear driven apparatus defined in claim 1, including:
    a casing formed about said driving member and said driven member and having an inner wall; and
    a braking spring surrounding said driving member normally engaging said inner wall of said casing and having end sections projecting within said arcuate slot for engagement with end walls of the slot.

4. A gear drive apparatus, which comprises:
    a shaft;
    a gear having a predetermined number of teeth mounted on said shaft;
    a plate member having a central opening for receiving said shaft, a number of embossments formed to extend from said central opening, each of said embossments having an inner gear-shaped cavity configured to conform to the shape of said teeth on said gear, at least one slot formed in an embossment to extend from said central opening; and
    at least one boss projecting from said shaft into said slot to locate a portion of each of the gear teeth in said gear-shaped cavities of said embossments.

* * * * *